United States Patent [19]

Imai et al.

[11] 3,742,076
[45] June 26, 1973

[54] PROCESS FOR THE PRODUCTION OF 5-ETHYLIDENE NORBORNENE-2

[76] Inventors: Horoshuke Imai, Yokohama; Mitsuo Matsuno, Kawasaki, both of Japan

[22] Filed: Mar. 3, 1971

[21] Appl. No.: 120,721

[30] Foreign Application Priority Data

Mar. 6, 1970  Japan.............................. 45/18705

[52] U.S. Cl. .......................................... 260/666 PY
[51] Int. Cl. ............................................ C07c 5/24
[58] Field of Search ............................. 260/666 PY

[56] References Cited
UNITED STATES PATENTS 2,926,199  2/1960  Schmerling ..................... 260/468 C
2,966,527  12/1960  Schmerling ..................... 260/666 PY
3,347,944  10/1967  Fritz .............................. 260/666 PY
2,754,337  7/1956  Chirtel ........................... 260/666 PY

*Primary Examiner*—Delbert E. Gantz
*Assistant Examiner*—Veronica O'Keefe
*Attorney*—Bucknam & Archer

[57] ABSTRACT

A process is disclosed for preparing 5-ethylidene norbornene-2 at high yield and with minimum cost. The process is characterized by the Diels-Alder reaction of 3-halobutene-1 with cyclopentadiene, whereby there is produced 5-haloethyl norbornene-2. This product is dehydrohalogenated with use of a Lewis base thereby obtaining 5-ethylidene norbornene-2.

12 Claims, No Drawings

PROCESS FOR THE PRODUCTION OF 5-ETHYLIDENE NORBORNENE-2

This invention relates to a process of preparing 5-ethylidene norbornene-2 by reacting cyclopentadiene with 3-halobutene-1 of the general formula:

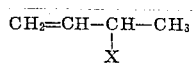

$$CH_2=CH-CH-CH_3$$
$$\phantom{CH_2=CH-C}|$$
$$\phantom{CH_2=CH-CH}X$$

where X is chlorine or bromine.

Recently, a copolymer of ethylene, propylene and non-conjugated diolefins commonly known as EPDM has acquired keen attention for its excellent weather-proofing, ozone-resistant and heat-resistant properties. The vulcanization rate of EPDM is inferior to that of widely used rubbers such as natural rubber, SBR and cis-polybutadiene. Moreover EPDM is difficult to covulcanize with these rubbers. Later improvements show that the problems of vulcanization of the EPDM copolymer per se and with the above-exemplified popular rubbers can be solved to a great extent by employing 5-ethylidene norbornene-2 as the non-conjugated diolefin in the preparation of the EPDM copolymer.

Exhaustive studies have been attempted in the preparation of 5-ethylidene norbornene-2 and have revealed a number of useful processes for its production. Examples of such processes include the Diels-Alder reaction of methyl allene (1,2-butadiene) with cyclopentadiene; rearranging the 5-vinylnorbornene-2 which may result from the Diels-Alder reaction of butadiene with cyclopentadiene (see U.S. Pat. No. 3,347,944); rearranging the 1-ethylnorbornadiene-2,5 produced by the Diels-Alder reaction of acetylene with ethylcyclopentadiene (see French Pat. No. 1,478,766); and rearranging the 5-ethylnorbornadiene-2,5 resulting from the Diels-Alder reaction of ethylacetylene with cyclopentadiene (see U.S. Pat. No. 3,151,173). These known processes have the disadvantages that they require the starting materials (methyl allene, ethylcyclo-pentadiene, ethylacetylene, etc.) which are extremely costly, and that they entail side reactions such as for example in the Diels-Alder reaction of butadiene with cyclopentadiene.

The present invention is directed to the provision different from the known processes and which can produce 5-ethylidene norbornene-2 at a relatively low cost. Typically, the process according to the invention employs as starting materials 3-halobutene-1 and cyclopentadiene for the production of 5-ethylidene norbornene-2 wherein the following two basic steps are involved.

Step 1. Subjecting 3-halobutene-1 and cyclopentadiene to the Diels-Alder reaction thereby to produce 5-haloethylnorbornene-2.

Step 2. Subjecting the resulting 5-haloethylnorbornene-2 to dehydrohalogenation thereby to produce 5-ethylidene norbornene-2.

The 3-halobutene-1 used in Step 1 may be prepared typically by the following reactions:
1. Reaction of butadiene with hydrogen halide.
2. Halogenation of butene mixtures.
3. Reaction of methylvinyl carbinol with hydrogen halide or phosphorus trihalogenide.

It will be understood that reaction of butadiene with hydrogen halide produces a mixture of 3-halobutene-1 and 1-halobutene-2, and this mixture may be separated by distillation into 3-halobutene-1 and 1-halobutene-2, respectively. The by-produced 1-halobutene-2 may be isomerized catalytically in the presence of a metallic salt such as iron halide, copper halide or zinc halide so as to form an equilibrium mixture of 1-halobutene-2 and 3-halobutene-1. This equilibrium mixture may be separated by distillation into 3-halobutene-1 and 1-halobutene-2, respectively. Repeated isomerization reaction and distillation of the 1-halobutene-2 permits the same to be isomerized almost quantitatively to 3-halobutene-1. This method of preparing the 3-halobutene-1 is literally most economical.

It is known that haloolefins undergo the Diels-Alder reaction with cyclopentadiene. For instance, the Diels-Alder reaction of allyl chloride with cyclopentadiene at 160°C produces 5-chlormethyl norbornene-2. However, the fact that 3-halobutene-1 undergoes the Diels-Alder reaction with cyclopentadiene is not known at the time of filing of this application.

We have now discovered that 5-haloethyl norbornene-2 may be prepared at high yield by subjecting 3-halobutene-1 and cyclopentadiene to the Diels-Alder reaction. This Diels-Alder reaction may be conducted at temperatures not exceeding 300°C, preferably between 150° and 250°C. Lower reaction temperature causes cyclopentadiene to preferentially undergo dimerization and hence reduces the yield of 5-haloethyl norbornene-2. Conversely, higher reaction temperature than 300°C entails the decomposition of 3-halobutene-1 and 5-haloethyl norbornene-2 and invites increased production of tetrahydro indene.

In the Diels-Alder reaction of 3-halobutene-1 and cyclopentadiene for preparing 5-haloethyl norbornene-2, there will be by-produced some cyclopentadiene polymers such as trimer, tetramer, etc. and some haloethyl octahydro dimethano naphthalene containing two moles of cyclopentadiene per mole of 3-halobutene-1. To reduce the formation of these high-molecular weight adducts to a minimum, the feed mol ratio of 3-halobutene-1/cyclo-pentadiene should preferably be in the range of 0.1 to 10.

The Diels-Alder reaction of 3-halobutene-1 and cyclopentadiene according to the invention may be effected in the absence of any solvent, or may be carried out in the presence of certain organic solvents which will not affect the reaction. Examples of such organic solvents are aliphatic hydrocarbons, aromatic hydrocarbons, alkyl halide, aryl halide, aliphatic alcohols, phenol derivatives, carboxylic acid, esters and the like. The reactor to be employed for the process of the invention may be, for example, glass-lined, or coated with fluorocarbon plastics (such as polytrifluoroethylene, "Perflon," etc.), or Hastelloy-made reactor, or similar reactors that are inert to hydrogen halide, 3-halobutene-1 and 5-haloethyl norbornene-2. Such inert type of reactor prohibits the tendency of plastization of the reactants. To further ensure the inhibition of undesirable plastization, there may be used polymerization inhibitors such as hydroquinone, catechol and the like.

The cyclopentadiene feed employed in the process of the invention may be readily available from the thermal decomposition of dicyclopentadiene. Alternatively, dicyclopentadiene may be used as an initial charge simply because it will be decomposed into cyclopentadiene during the Diels-Alder reaction. The Diels-Alder reaction mixture may be distilled for separating the desired 5-haloethyl norbornene-2. Unreacted 3-halobutene-1, cyclopentadiene and dicyclopentadiene may be further subjected to the Diels-Alder reaction according to the invention. The 1-halobutene-2 which results from the rearrangement of 3-halobutene-1 during the Diels-Alder reaction may be reverted to 3-halobutene-1 by catalytic isomerization in the presence of a metallic salt such as iron halide, copper halide, zinc halide, chrome halide or aluminum sulfate.

The 5-haloethyl norbornene-2 which is produced according to Step 1 referred to hereinabove will be subjected to dehydrohalogenation thereby to produce ultimate 5-ethylidene norbornene-2. The dehydrohalogenation reaction follows the Saytzeff rule and produces mainly 5-ethylidene norbornene-2 but sometimes with a small amount of 5-vinylnorbornene-2. To enhance the dehydrohalogenation of 5-haloethyl norbornene-2, there may be used certain agents. These may be Lewis base such as those exemplified below.

i. Alkali metal hydroxide such as KOH, NaOH and LiOH,
ii. Alkali metal alcohoxide MeOR where Me is potassium sodium or lithium and R is alkyl or aryl radical,
iii. Alkali metal amide (products resulting from the reaction of an alkali metal with ammonium, or primary or secondary amines of aliphatic or aromatic hydrocarbon),
iv. Alkali metal carbonates (such as $Na_2CO_3$, $NaHCO_3$, $K_2CO_3$ and $KHCO_3$),
v. Alkali metal salts of organic acid (such as potassium formate, sodium acetate and sodium propionate),
vi. Alkaline earth metal oxides or hydroxides (such as CaO, MgO, BaO, SrO, $Mg(OH)_2$, $Ca(OH)_2$, $Sr(OH)_2$ and $Ba(OH)_2$,
vii. Alkaline earth metal alcohoxides and amides (such as products resulting from the reaction of Ca, Mg, Ba, or Sr with alcohol, phenols, ammonium, or primary or secondary amines of aliphatic or organic hydrocarbon),
viii. Tertiary amines (such as trimethyl amine, dimethyl aniline, pyridine, piperidine and quinoline),
ix. Two or more combinations of the above classes of Lewis base.

The reaction of 5-haloethyl norbornene-2 and dehydrohalogenation agents varies with the type of dehydrohalogenation agent and the kind of halogen chosen, but it should be conducted at temperatures ranging between 0°C and 250°C, preferably between 30°C and 200°C. The amount of the dehydrohalogenation agent to be reacted with 5-haloethyl norbornene-2 is not necessarily limited, but suitably is about equivalent to or twice greater in mols than the latter to obtain satisfactory results.

The aforesaid Step 2 of the process, i.e. dehydrohalogenation, may be carried out without use of any solvent. However, there may be used a certain class of solvent which include:

Water, methanol, ethanol, 1-butanol, acetone, dimethyl formamide, dimethylacetamide, acetonitrile, nitrobenzene, sulfolan, dimethylsulfoxide, N-methyl pyrolidone and hexamethyl phosphor triamide.

The 5-ethylidene norbornene-2 which results from the dehydrohalogenation of 5-haloethyl norbornene-2 may be separated by distillation. The 5-vinyl norbornene-2 which is also produced during the dehydrogenation reaction may be isomerized to 5-ethylidene norbornene-2 in the manner taught by the prior art including U.S. Pat. No. 3,347,944 French Pat. Nos. 1,525,727, 1,529,455, 1,536,366, 1,556,198 and 155,199 and Belgian Pat. No. 717,118.

The process of the invention will be further described by the following examples which are presented by way of illustration and not of limitation.

EXAMPLE 1

Acetic acid (300 milliliters) was introduced into a 500 milliliters, glass autoclave and with cooling to 0°C, there was added hydrogen chloride gas (2 mols). This was followed by the addition of butadiene (54g; 1 mol) cooled at −78°C. The reactor was then sealed and shaken at room temperature (25°C) for 12 hours. Upon completion of the reaction, unreacted butadiene was removed from the reaction liquid. The reaction liquid was washed with water and the organic layer was dried with $Na_2SO_4$ anhydride. It was thereafter distilled to obtain 3-chlorobutene-1 (32g) and 1-chlorobutene-2 (15g).

Into a relatively thick glass ample there were introduced 3-chlorobutene-1 (30g; 0.33 mol), cyclopentadiene (22g; 0.3 mol) and hydroquinone (0.5g). The ample was sealed and heated at 165°C for five hours. The ample was then cooled and opened, and the reaction liquid was distilled to obtain 5-chloroethyl norbornene-2 (24g) boiling at 95°C/4mmHg. Gas chromatographic analysis using tris cyano ethoxypropane as liquid layer indicated that the resulting 5-chloroethyl norbornene-2 was 97 percent pure, exo and endo type mixture. This product (24g; 0.15 mol) was placed in nitrogen-purged 300 milliliters flask, followed by the addition of powdery $KOt-C_4H_9$ (22g; 0.2 mol) and dimethylformamide (200 milliliters). The flask was then heated at 130°C with stirring for one hour. Upon completion of the reaction, n-hexane (100 milliliers) was added. The reaction liquid was thereafter washed with water and dried with $Na_2SO_4$ anhydride. After removal of n-hexane by crude distillation, the reaction liquid was distilled to obtain 5-ethylidene norbornene-2 (11g; 0.09 mol).

EXAMPLE 2–10

A glass-lined 2 liters autoclave equipped with Hastelloy stirring rod was employed, into which there was first added 35 percent hydrochloric acid (1 liter). To this autoclave, while being cooled to 0°C, was injected hydrogen chloride (2.5 mols), followed by introduction of butadiene (270g; 5 mols) cooled to −78°C. The reaction was continued with stirring at 0°C for five hours. Upon completion of the reaction, unreacted butadiene was removed, and the organic layer was washed with water and distilled to obtain 3-chlorobutene-1 (240g) and 1-chloro-butene-2 (133g).

Into a glass-lined autoclave equipped with Hastelloy stirring rod were charged 3-chlorobutene-1 (180g; 2 mols), dicyclopentadiene (132; 1 mol) and hydroquinone (0.1g). The reaction was continued at 180°C for 5 hours. Upon completion of the reaction, the reaction liquid was distilled to obtain 5-chloroethyl norbornene-2 (170g) from which hydrogen chloride was removed with use of the dehydrochlorinating agents shown in the following table, thereby producing 5-ethylidene norbornene-2. The removal of hydrogen chloride was effected in a 200 milliliters autoclave equipped with stirrer. In order to avoid repetitive details, the reaction conditions employed for the various examples are given in the table below, where the conditions common to all the examples are:

5-chloroethyl norbornene-2 (15.6g; 0.1 mol); solvent (100 milliliters).

| Example | Dehydrochlorinating agent | Solvent | Reaction temperature (°C.) | Reaction time (hrs.) | Yield of 5-ethylidene norbornene-2 (g.) |
| --- | --- | --- | --- | --- | --- |
| 2 | Powdery KOH, 11.2 g.; 0.2 mol | Dimethylsulfoxide | 160 | 10 | 10.3 |
| 3 | Powdery LiOC$_2$H$_5$, 10.4 g.; 0.2 mol | Hexamethylphosphortriamide | 180 | 2 | 7.2 |
| 4 | Powdery NaOC$_2$H$_5$, 13.6 g.; 0.2 mol | Methanol | 150 | 3 | 4.4 |
| 5 | Powdery Na$_2$CO$_3$, 21.2 g.; 0.2 mol | Acetone | 180 | 5 | 3.7 |
| 6 | Powdery CH$_3$COONa, 16.4 g.; 0.2 mol | Acetonitrile | 180 | 10 | 2.5 |
| 7 | NaNMe$_2$, 10.0 g.; 0.15 mol | Nitrobenzene | 150 | 5 | 8.7 |
| 8 | BaO, 30.6 g.; 0.2 mol | | 180 | 10 | 2.1 |
| 9 | Ca(OMe)$_2$, 20.4 g.; 0.2 mol | Dimethylformamide | 150 | 10 | 3.1 |
| 10 | Pyridine, 39.5 g.; 0.5 mol | | 180 | 5 | 5.7 |

The amounts of 5-ethylidene norbornene-2 shown in the above table were determined by gas chromatography.

EXAMPLE 11

Methylvinyl carbinol (114g; 2 mols) was charged into a 1 liter glass flask, and HBr (2 mols) was added with stirring. The reaction was continued at 30°C for three hours. The reaction liquid was washed with water, dried and distilled to obtain 3-bromobutene-1 (132g). Into a relatively thick glass ample there were introduced 3-bromobutene-1 (40.5g; 0.3 mol), dicyclopentadiene (20g; 10.15 mols) and t-butyl catechol (0.06g). The ample was sealed, and the reaction was continued at 180° C for five hours. A similar ample reaction was repeated five times, and the reaction liquid in each case was collected, water-washed, dried and distilled to obtain 5-bromoethyl norbornene-2 (110g). Into an autoclave containing powdery NaOH (20g; 0.5 mol) there were charged dimethylform amide (200 milliliters) and 5-bromoethyl norbornene-2 (40g; 0.2 mol), and the reaction was continued at 160°C for one hour. Upon completion of the reaction, there was added n-hexane (100 milliliters), and the reaction liquid was washed with water, dried and subjected to crude distillation thereby to remove the n-hexane. The resulting reaction liquid was distilled to obtain 5-ethylidene norbornene-2 (15.5g).

EXAMPLE 12

Chlorobutene mixture resulting from reacting butene-1 (336g) with chlorine (425g) at 380°C was distilled to obtain 3-chlorobutene-1 (72g). Into a Hastelloy autoclave were charged 3-chlorobutene-1 (63g; 0.7 mol), cyclopentadiene (26g; 0.4 mol) and t-butylcatechol (0.01g), and the reaction was continued at 200°C for five hours. The reaction liquid was fractionated to obtain 5-chloroethyl norbornene-2 (35g). Into a nitrogen-purged flask were introduced hexamethyl phosphor triamide (300 milliliters) and Na (9.2g; 0.4 mol), followed by addition of diethyl amine (29g; 0.4 mol). The reaction ws conducted with heat and reflux. 5-chloroethyl norbornene-2 (31g; 0.2 mol) was introduced by droplets into the flask, and the reaction was continued at 140°C for two hours. Upon completion of the reaction, n-hexane (100 milliliters) was added, and the reaction liquid was washed with water, dried and subjected to crude distillation to remove the n-hexane. The reaction liquid was then distilled to obtain 5-ethylidene norbornene-2 (6.1g).

EXAMPLE 13

In to a glass-lined autoclave were charged glacial acetic acid (1 liter) and butadiene (270g; 5 mols). While cooling the autoclave to 0°C, there was added hydrogen chloride (220g; 6 mols). The reaction was continued at room temperature for 24 hours. Upon completion of the reaction, the reaction liquid was washed with water, dried and distilled to obtain 3-chlorobutene-1 (314g).

The resulting 3-chloro-butene-1 (270g; 3 mols) and cyclopentadiene (98g; 3 mols) were charged into a glass-lined autoclave and continued to react at 150°C for eight hours. The reaction liquid was separated to obtain 5-chloroethyl norbornene-2 (106g). This product (94g; 0.3 mol) was introduced by droplets into a flask containing 10 percent lime milk (500 milliliters), and the reaction was continued at 100°C for eight hours. With addition of n-hexane (100 milliliters), the product was extracted, washed with water, dried and distilled to obtain 5-ethylidene norborne-2 (11.5g).

EXAMPLE 14

Into a glass-lined autoclave were charged glacial acetic acid (0.5 liter), benzoyl peroxide (0.1g), butadiene (270g; 5 mols), and hydrogen chloride (220g; 6 mols). The reaction was continued at room temperature for 24 hours. The reaction liquid was washed with water, dried and distilled to obtain 3-chlorobutene-1 (354g). This product (315g; 3.5 mols) and dicyclopentadiene (66g; 0.5 mol) were charged into a Perflon-line autoclave and reacted at 240°C for three hours. The reaction liquid was washed with water, dried and distilled to obtain 5-chloroethyl norbornene-2 (56g). Into a glass-lined autoclave there were charged 5-chloroethyl norbornene-2 (47g; 0.3 mol) and quinoline (51.5g; 0.5 mol), and the reaction was continued at 150°C for six hours. The reaction product was distilled to obtain 5-ethylidene norbornene-2 (20.5g).

EXAMPLE 15

35 percent hydrochloric acid (1 liter) and butadiene (540g; 10 mols) were charged into a glass-lined autoclave, followed by injection of hydrogen chloride (3 mols). The reaction was continued at 25°C for 24 hours. The reaction liquid was washed with water, dried and distilled to obtain 3-chlorobutene-1 (517g).

The resulting 3-chloro-butene-1 (495g; 5.5 mols) and dicyclopentadiene (330g; 2.5 mols) were charged into a glass-lined autoclave and continued to react at 180°C for five hours. The reaction product was washed with water, dried and distilled to obtain 5-chloroethyl norbornene-2 (392g). Into a Hastelloy autoclave there were introduced NaOt-C$_4$H$_9$ (144g; 1.5 mols), 5-chloroethylnorbornene-2 (195g; 1.25 mols) and dimethyl form amide (1 liter), and the reaction was continued with vigorous stirring at 150°C for six hours. The reaction liquid was mixed with n-hexane (200 milliliters), and this mixture was washed with water, dried and distilled to obtain 5-ethylidene norbornene-2 (112g).

EXAMPLE 16

Acetic acid (500 milliliters) and butadiene (270g; 5 mols) were charged into a glass-lined autoclave, followed by injection of hydrogen chloride (292g; 8 mols). The reaction was continued at 250°C for 10 hours. The reaction liquid was washed with water, dried and distilled to obtain 3-chlorobutene-1 (369g).

The resulting 3-chlorobutene-1 (362g; 4 mols), dicyclopentadiene (132g; 2 mols), methanol (500 milliliters) and hydroquinone (0.5g) were charged into a Hastelloy autoclave and continued to react at 150° C for 10 hours. The reaction liquid was washed with water, dried and distilled to obtain 5-chloroethyl norbornene-2 (187g).

30 percent caustic soda solution (200 milliliters) and 5-chloroethyl norbornene-2 (179g; 1.15 mols) were charged into a Hastelloy autoclave and continued to react at 150°C for six hours. The reaction product was washed with water, dried and distilled to obtain 5-ethylidene norbornene-2 (73.3g).

What is claimed is:

1. A process of preparing 5-ethylidene norbornene-2 which comprises subjecting 3-halobutene-1 to the Diels-Alder reaction with cyclopentadiene to form 5-haloethyl norbornene-2, and dehydrohalogenating the resulting 5-haloethyl norbornene-2 with use of a Lewis base, said Diels-Alder reaction being conducted at temperatures ranging between 150° and 250°C.

2. The process as defined in claim 1 wherein halogen in said 3-halobutene-1 is chlorine.

3. The process as defined in claim 1 wherein halogen in said 3-halobutene-1 is bromine.

4. A process of preparing 5-ethylidene norbornene-2 which comprises subjecting 3-halobutene-1 to the Diels-Alder reaction with cyclopentadiene at 150°–250°C, distilling the resulting reaction mixture to separate 5-haloethyl norbornene-2, and dehydrohalogenating the resulting 5-haloethyl norbornene-2 with use of a Lewis base at 30°–200°C.

5. The process as defined in claim 1 wherein said Lewis base is a member selected from the group consisting of alkali hydroxides, alkali metal alkoxides, alkali metal amides, alkali metal carbonates, alkali metal salts of organic acids, alkaline earth metal oxides and hydroxides, alkaline earth metal alkoxides and amides and tertiary amines or mixtures thereof.

6. A process of preparing 5-ethylidene norbornene-2 which comprises subjecting 3-halobutene-1 to the Diels-Alder reaction with cyclopentadiene to form 5-haloethyl norbornene-2, and dehydrohalogenating the resulting 5-haloethyl norbornene-2 with use of a Lewis base, said Diels-Alder reaction being conducted at temperatures ranging between 150° and 250°C and in the presence of an inhibitor.

7. The process as defined in claim 6 wherein said inhibitor is hydroquinone.

8. The process as defined in claim 6 wherein said inhibitor is catechol.

9. The process as defined in claim 1 wherein the Diels-Alder reaction takes place with dicyclopentadiene.

10. The process as defined in claim 1 wherein the mol ratio of said 3-halobutene-1 to said cyclopentadiene is in the range of 0.1 to 10.

11. The process as defined in claim 1 wherein the mol ratio of said Lewis base to said 5-haloethyl norbornene-2 is in the range of 1 to 2.

12. The process as defined in claim 1 wherein said dehydrohalogenation is conducted in the presence of a solvent selected from the group consisting of water, methanol, ethanol, 1-butanol, acetone, dimethyl formamide, dimethylacetamide, acetonitrile, nitrobenzene, sulfolan, dimethylsulfoxide, N-methyl pyrrolidone and hexamethyl phosphor triamide.

* * * * *